United States Patent [19]
Hikita et al.

[11] Patent Number: 5,253,098
[45] Date of Patent: Oct. 12, 1993

[54] OPTICAL SCANNER

[75] Inventors: Kazuyasu Hikita; Hiroyuki Iizuka; Yoshiaki Tanaka, all of Saitama, Japan

[73] Assignee: Mitsubishi Materials Corporation, Tokyo, Japan

[21] Appl. No.: 883,600

[22] Filed: May 14, 1992

[30] Foreign Application Priority Data

May 23, 1991 [JP] Japan .................. 3-147983

[51] Int. Cl.$^5$ .............................................. G02B 26/08
[52] U.S. Cl. ........................................ 359/213; 359/224
[58] Field of Search ............... 359/196, 198, 199, 213, 359/220, 223, 224; 369/44.15, 44.16

[56] References Cited

U.S. PATENT DOCUMENTS

| | | | |
|---|---|---|---|
| 1,760,383 | 5/1930 | Thomas | 359/224 |
| 1,980,888 | 11/1934 | Thomas | 359/224 |
| 2,920,529 | 1/1960 | Blythe | 359/224 |
| 3,614,677 | 10/1971 | Wilfinger | 359/224 |

*Primary Examiner*—Loha Ben
*Attorney, Agent, or Firm*—McAulay, Fisher, Nissen, Goldberg & Kiel

[57] ABSTRACT

An optical scanner for scanning light signals, such as light beams, including an electrostrictive element attached at one end thereof to a base body, a convex mirror fixed to the other end of the electrostrictive element, a driving circuit for changing a voltage applied to the electrostrictive element, and an emitter for emitting a light beam to the surface of the convex mirror in a direction different from the modified direction of the electrostrictive element. When the applied voltage to the electrostrictive element changes by the driving circuit during reflecting light beams on the convex mirror surface, the electrostrictive element is modified according to the applied voltage. Simultaneously light beams are scanned over a wide range, even if the modified volume is small, due to continuous change of deflection angles of beams according to the radius of the curvature of the convex mirror.

18 Claims, 4 Drawing Sheets

OPTICAL SCANNER

BACKGROUND OF THE INVENTION

I. Field of the Invention

This invention relates to an optical scanner for scanning light signals, such as light beams. More particularly, this invention relates to an optical scanner with an electrostrictive element or, in particular, a piezoelectric element for generating a modification by applying a voltage. It is mainly used, for example, as a device for conducting light beams to a predetermined position of a photosensitive material of a laser beam printer and further used for various portable and battery-operated optical apparatuses.

II. Description of the Prior Art

In a conventional optical scanner, a polygon mirror is rotated by an electric motor, the conventional optical scanner needs a shock-absorbing device for eliminating the vibration accompanied with motor driving as well as a mechanism for rotating the polygon mirror. Consequently, the mechanism not only becomes complicated, but also the total volume and weight thereof become bigger. The conventional optical scanner is not suitable for various portable apparatuses which need a little electric power.

To solve these problems, Japanese Examined Published Patent Application No. 52-40215, Japanese Unexamined Published Patent Applications No. 60-177316 and No. 61-132919 disclose light deflecting apparatuses using a bimorph type piezoelectric element or a multilayer type piezoelectric element.

In the apparatus with the bimorph type piezoelectric element, one end of the piezoelectric element is fixed and the other end is connected to a lower part on the periphery of a reflecting mirror to support the mirror and to incline the mirror when the piezoelectric element is modified and bent by applying a voltage.

In the apparatus with the multilayer piezoelectric element, a supporting plate for a mirror is provided at its upper surface with the mirror surface, and the plate is vacillatingly attached to one point as a fulcrum. Modifiable ends of two multilayer type piezoelectric elements, which expand and contract upwardly and downwardly, are connected to the lower surface of the supporting plate through a flexible and elastic driving member at two positions. The two positions are separated from the fulcrum and are located on a plane including both an X-axis and a Y-axis that pass the fulcrum and cross at right angle to each other.

In this apparatus, when the piezoelectric elements are given a different volume or a different time of expanding or contracting each other by changing voltages applied thereto, the driving member acts as lever and drives the reflecting mirror to incline along various angles according to the applied voltages to thereby generate plural vacillations. As a result, the reflecting mirror can rapidly deflect incident light signals to an arbitrary direction.

Since each of reflecting mirrors of the conventional apparatuses is a heavy flat mirror, the former apparatus is defective in strength and in that its deflecting angle is comparatively small. Since the reflecting mirror of the latter apparatus is driven by the multilayer type actuator and the modified volume of the supporting plate is not big without using a lever such as the driving member, the latter apparatus is defective in that a large deflecting angle cannot be obtained without a complicated mechanism.

SUMMARY OF THE INVENTION

An object of this invention is to provide an optical scanner that has a simple mechanism and that can obtain precise as well as big deflection angles without using a lever.

A further object of this invention is to provide an optical scanner in which the scanning speed can be set up arbitrarily.

A still further object of this invention is to provide an optical scanner having a light weight and a small size by using a piezoelectric element instead of an electric motor as an actuator.

Another object of this invention is to provide an optical scanner, which consumes a small quantity of electric power, and produces only a little mechanical vibration and has a mechanically decreased noise from a driving source, by driving an electrostrictive element with applying voltage.

An optical scanner in accordance with this invention comprises an electrostrictive element having two ends, one of the two ends being attached to a base body, the other of the two ends being free and modifiable by applying a voltage, a convex mirror fixed to the other of the two ends of the electrostrictive element, a driving circuit for changing a voltage applied to the electrostrictive element, and means for emitting a light beam onto the surface of the convex mirror in a different direction from the modified direction of the electrostrictive element.

It is preferable that the electrostrictive element may be a bimorph type piezoelectric element or a multilayer type piezoelectric element. The former element is advantageous in that it requires less driving electric power than the latter element because the total surface area of the former element is smaller than that of the latter element. The latter element is advantageous for precise modification and in scanning with high precision. In the latter element, when the convex mirror is fixed on the upper end surface of the element perpendicular to the modified direction, the modified volume preferably becomes big. Also, in case that the mirror surface of the convex mirror consists in an overall surface or a partial surface of a spherical, cylindrical, or columnar body, incident light beams preferably do not reflect irregularly.

Further, in addition to the bimorph type piezoelectric element and the multilayer type piezoelectric element, a monomorph type piezoelectric element and the other prior electrostrictive elements may be used as the inventive electrostrictive element. Furthermore, the bimorph type piezoelectric element may not only be the parallel type, but also the series type. The emitting means may not only be a He-Ne laser, but it may also be an illuminating lamp, etc.

In operation, when the applied voltage to the electrostrictive element is changed by the driving circuit in the state of reflecting light beams onto the convex mirror surface, the electrostrictive element is modified according to the applied voltage. Simultaneously light beams are scanned over a wide range, even if the modified volume is small, due to a continuous change of deflection angles of beams according to the radius of the curvature of the convex mirror.

As shown in FIG. 7 in detail, an incident beam $a_0$ is emitted onto the mirror surface A of the convex mirror 13 in the unmodified electrostrictive element 10 and then becomes a reflected beam $a_1$. At that time the beam $a_0$ is emitted at an angle $\Theta_1$ for a normal line $b_1$, while the beam $a_1$ reflects at an angle $2\Theta_1$ for the beam $a_0$.

When the electrostrictive element 10 is modified and moved to a position shown by a two-dot chain line (below the full line 10) by applying a voltage, the beam $a_0$ becomes a beam $a_2$ at the mirror surface B of the convex mirror 13. At that time, the beam $a_0$ is emitted at an angle $\Theta_2$ for a normal line $b_2$, while the beam $a_2$ reflects at an angle $2\Theta_2$ for the beam $a_0$.

A deflection angle $\Delta\Theta$ for this optical scanner is obtained as a difference between the angle $2\Theta_2$ and the angle $2\Theta_1$. The increasing rate of the reflection angle $2\Theta_2$ is extremely high in comparison with that of the modified volume $\delta$ of the element 10. Therefore, the deflection angle of this optical scanner become extremely big in comparison with that of the conventional flat mirror. Particularly, this optical scanner can be scanned with a comparatively high speed or in a finer density, in case that the radius of curvature of the convex mirror 13 is decided according to the modified volume of the element 10.

BRIEF DESCRIPTION OF THE DRAWINGS

Various other objects and purposes of the invention will become evident from the following detailed description taken in connection with the accompanying drawings.

DESCRIPTION OF THE PREFERRED EMBODIMENTS

Figure 1:
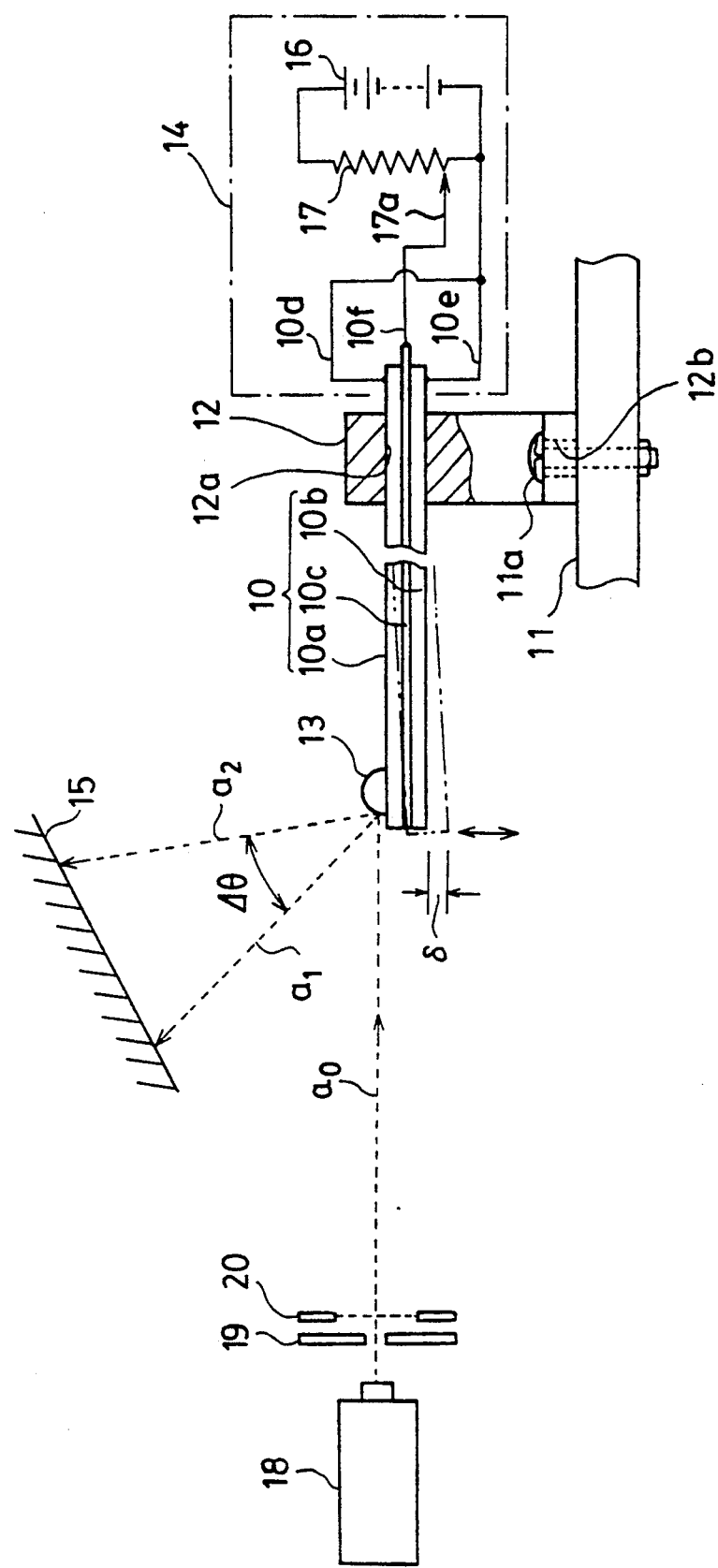
FIG. 1 is a partially sectional view of the optical scanner in accordance with this invention illustrating a first embodiment using a bimorph type piezoelectric element.
Figure 2:
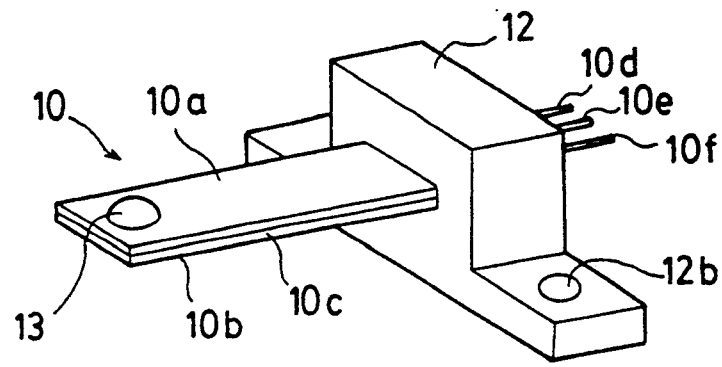
FIG. 2 is a perspective view of the optical scanner shown in FIG. 1.
Figure 7:
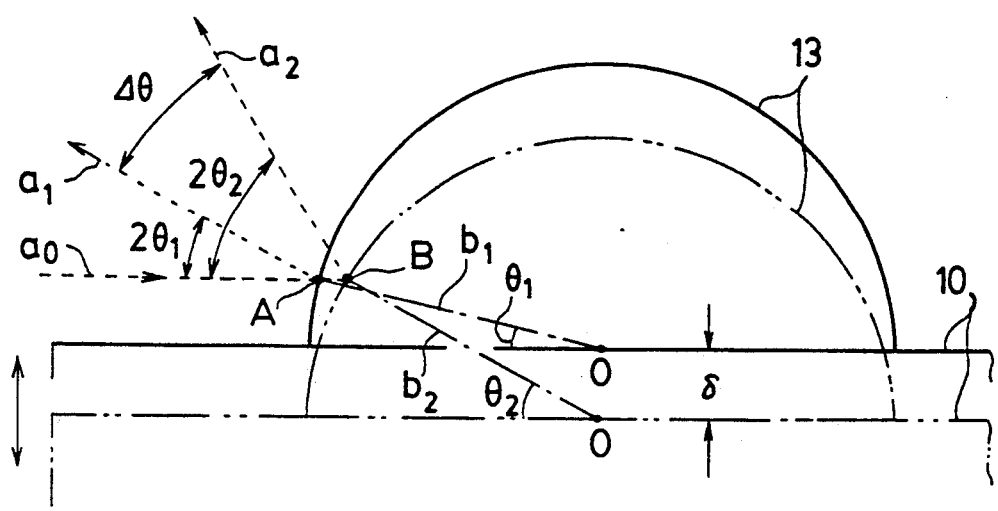
FIG. 7 is an enlarged partial side view of the invention illustrating a relationship between an incident beam and a reflective beam when the piezoelectric element is modified as shown in FIG. 1.

As shown in FIGS. 1 and 2, in the first embodiment the electrostrictive element is the parallel bimorph type piezoelectric element 10 The element 10 is manufactured by adhering both piezoelectric plates 10a and 10b, each having a dimension of 30 mm in length, 10 mm in width and 0.2 mm in thickness to the upper and lower surfaces of a conductive plate 10c of 0.1 μm in thickness. One end of the piezoelectric element 10 is fixed into a penetrated hole 12a of a base body 12 by an epoxy type resin adhesive agent. The base body 12 is fixed to a frame 11 at the lower part by a screw 11a through a hole 12b. A hemispherical convex mirror 13 of about 1 mm in radius is fixed on the upper surface of the other end of the element 10 by the epoxy type resin adhesive agent. A driving circuit 14 is electrically connected to the one end of the element 10. A lead 10d is connected to an external electrode of the piezoelectric plate 10a and a lead 10e is connected to an external electrode of the piezoelectric plate 10b. Moreover, a lead 10f is connected to the conductive plate 10c. The driving circuit 14 is provided with a power supply 16 and a variable resistor 17. The variable element 17a of the resistor 17 is connected to the lead 10f. Sliding of the element 17a enables the application of direct current voltages in the range of from 0 V to 200 V between both external electrodes of the piezoelectric plates 10a and 10b. A light source 18 of a He-Ne laser, a slit 19, and a filter 20 are arranged at a predetermined distance from the other end of the piezoelectric element 10. The light source 18 is composed so as to emit its light beam $a_0$ in the direction perpendicular to the modified direction of the piezoelectric element 10 onto the mirror surface of the convex mirror 13 as shown by arrows with a solid line in FIG. 1. In this embodiment, the light source is controlled to emit the beam $a_0$ on the point A (as shown in FIG. 7) of about 0.2 mm in height from the adherent surface of the convex mirror 13 in the unmodified state of the element 10.

In the aforesaid composed optical scanner, light beams emitted from the light source 18 are stopped down to become the beam $a_0$ by slit 19 and filter 20, and then the beam $a_0$ reaches the mirror surface of convex mirror 13. The beam $a_0$ reflects from the mirror surface to thereby reach a screen 15. When the applied voltage to the piezoelectric element 10 is continuously increased from 0 volt to 200 volts and subsequently is continuously decreased from 200 V to 0 V by driving circuit 14, the piezoelectric element 10 is modified from the position shown in a full line to another position shown (moved downwardly as shown in FIG. 1) in a two-dot chain line and then it is restored to the original state. The frequency of pulse signals in triangular waveform is arbitrarily selected in the range of from 1 Hz to 30 Hz. The maximum modified displacement of the piezoelectric element 10 was 0.8 mm and the maximum deflection angle $\Delta\Theta$ (between $a_1$ and $a_2$) of this optical scanner was about 80 degrees.

Figure 3:
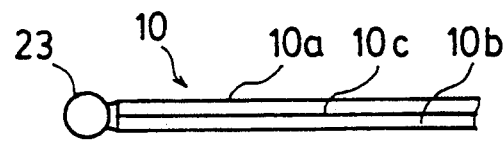
FIG. 3 is a partial side view of the invention illustrating a second embodiment using the bimorph type piezoelectric element.

FIG. 3 illustrates the second embodiment of this invention. In this embodiment a spherical convex mirror 23 of about 1 mm in radius is adhered to the pointed end of the bimorph type piezoelectric element 10 with the same adhesive as the first embodiment instead of the hemispherical mirror 13.

This optical scanner is advantageous in that bigger deflection angles are obtained, because the mirror surface of the convex mirror 23 that is capable of emitting the beam $a_0$ is wide and the beam is not intercepted by the piezoelectric element 10.

Figure 4:
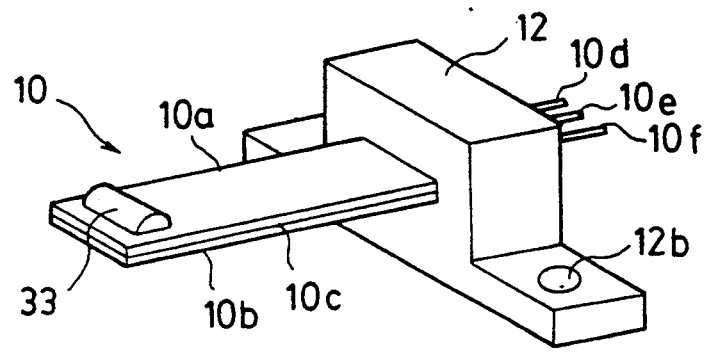
FIG. 4 is a perspective view of the invention illustrating a third embodiment using the bimorph type piezoelectric element.

FIG. 4 illustrates the third embodiment of this invention. In this embodiment a hemi-cylindrical or semi-cylindrical cylindrical convex mirror 33 of about 2 mm in radius and 7 mm in length is adhered to the same position as the first embodiment by the same adhesive agent as the first embodiment instead of the hemispherical mirror 13. The light source emits beams onto the mirror surface of the convex mirror 33 after the piezoelectric element 10 is fixed to the frame through the base body 12 and then electrically connected to the driving circuit in the same manner as the first embodiment. In the third embodiment, a position of the light source is adjusted so as to emit the beam $a_0$ onto the point of about 1.0 mm in height from the adherent surface of the convex mirror 33 in the unmodified state of the element 10. When the piezoelectric element 10 was modified by applying voltages in the range of from 0 V to 200 V in the same manner as the first embodiment, the maximum deflection angle was about 55 degrees.

The hemi-cylindrical body of the convex mirror 33 was substituted by individual semi- or hemi-columnar bodies of 10 mm in radius of curvature and 100 mm in length, and of 100 mm in radius of curvature and 7 mm in length, respectively. The size of the bimorph type piezoelectric element wa selected according to the size of these convex mirrors.

When the beam was emitted so that the incident angle $\theta_1$ as shown in FIG. 7 might become 45 degrees and simultaneously the piezoelectric element was modified, the maximum deflection angle was 11.9 degrees in case of the radius of curvature being 10 mm, and the same was 1.2 degrees in case of 100 mm. These experimental results reveal that the scanning can become more precise, but the deflection angle becomes smaller in accordance with the mirror radius being bigger. Also, even if the incident light beams are broad, the inventive optical scanner can reflect without reducing the incident light volume by using the hemi-cylindrical or hemi-columnar convex mirror. The convex mirror 33 may be fixed to the pointed end of the piezoelectric element in the form of a cylindrical or columnar body as shown in FIG. 3 instead of the hemi-cylindrical or hemi-columnar body. The hemi-cylindrical or cylindrical mirror is more light weight in comparison with the hemi-columnar or columnar mirror, thereby being suitable for the bimorph type piezoelectric element.

Figure 5:
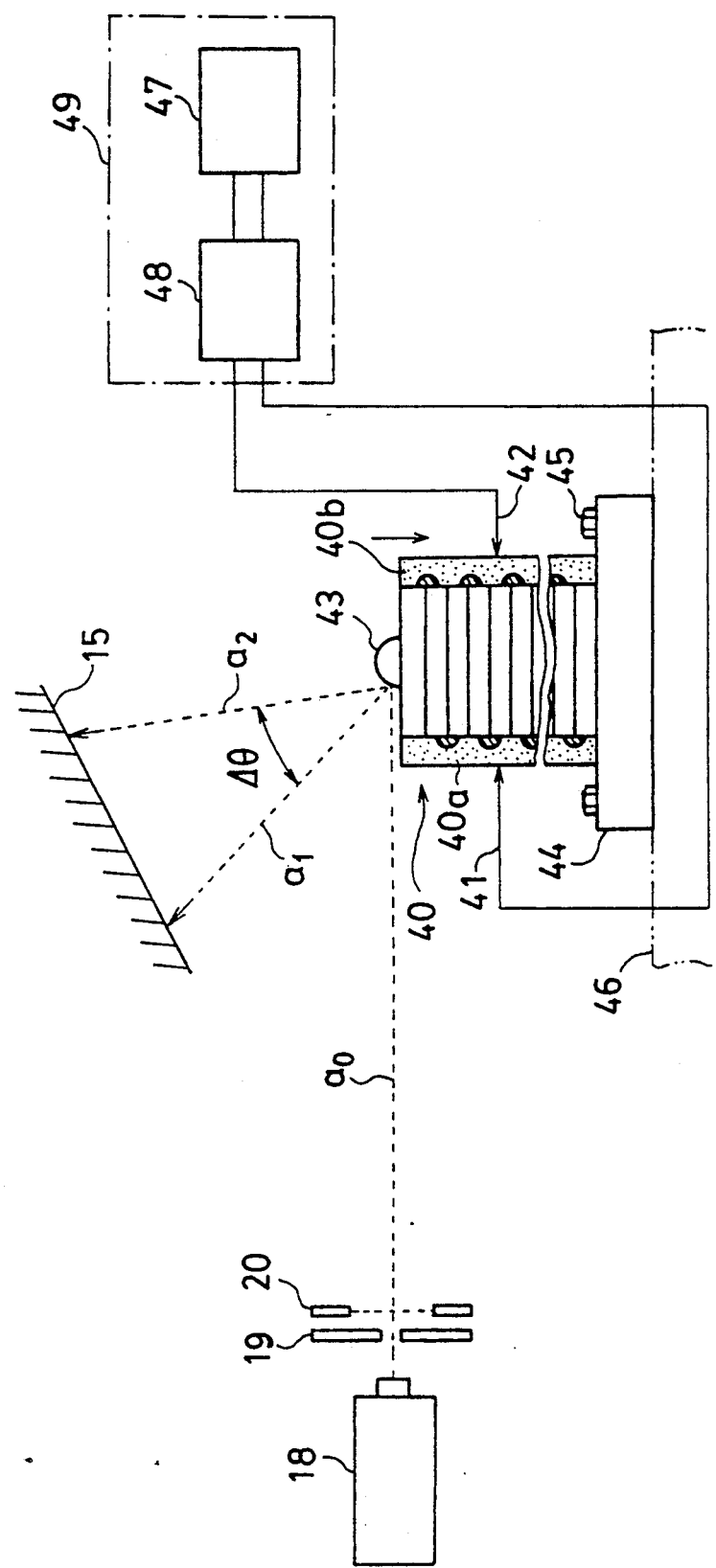
FIG. 5 is a partially sectional view of the invention illustrating a fourth embodiment using a multilayer type piezoelectric element.
Figure 6:
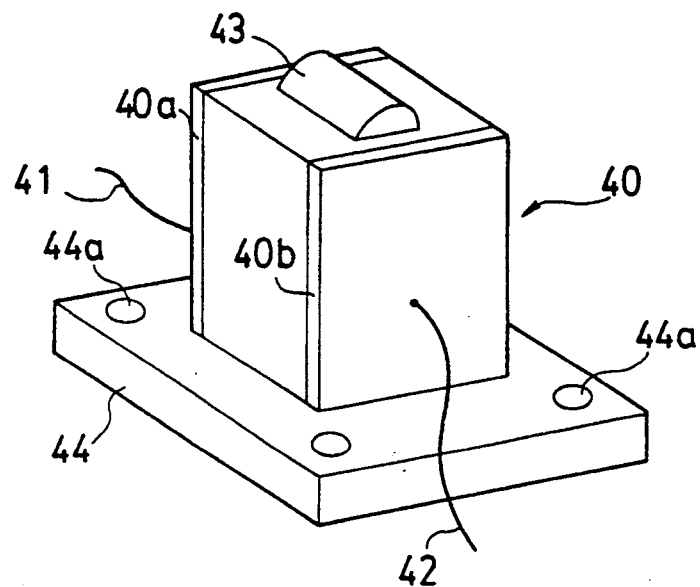
FIG. 6 is a perspective view of the optical scanner shown in FIG. 5.

FIGS. 5 and 6 illustrate the third embodiment of this invention. The same reference numerals as shown in FIG. 1 designate the same composed elements or parts. In this embodiment an electrostrictive element is a multilayer type piezoelectric element 40. A convex mirror 43 is adhered to the central position of the upper surface of the element 40 by the same adhesive agent as the first embodiment. The piezoelectric element 40 of the multilayer actuator is a rectangular parallelepiped having a dimension of 8 mm in length, 8 mm in width, and 10 mm in height. The convex mirror 43 is a hemicolumnar body of 1.0 mm in radius and 7 mm in length.

The piezoelectric element 40 is adhered to a base body 44 by the same adhesive agent as the first embodiment, and the base body 44 is fixed to a base plate 46 by the bolt 45 which passes through a hole 44a. Individual lead wires 41 and 42 are soldered to external electrodes 40a and 40b of the element 40, respectively. A circuit for generating signals 47 is connected to the lead wires 41 and 42 through an amplifying circuit 48. When voltages with the same signal wave-form as the first embodiment is applied to the multilayer type piezoelectric element 40 by a driving circuit 49 having the circuits 47 and 48, the element 40 is adapted to be modified about 10 $\mu$m to the direction shown by an arrow with a full line in FIG. 5.

The piezoelectric element 40 was arranged on the base body 44 so as to receive the beam $a_0$ on the mirror surface of the convex mirror 43 from the light source 18 to the direction perpendicular to both modified direction of the element 40 and longitudinal direction of the convex mirror 43. Furthermore, the beam was emitted so that the incident angle $\theta_1$ shown in FIG. 7 might become 45 degrees and 80 degrees, respectively, and then the piezoelectric element was modified. The maximum deflection angle was 1.6 degrees in case of the incident angle being 45 degrees and the same was 8.3 degrees in case of 80 degrees. These experimental results reveal that the deflection angle becomes bigger in accordance with the incident angle $\theta_1$ being bigger.

While there has been shown and described what is considered to be the preferred embodiments of the invention, it will be obvious to those skilled in the art that various changes and modifications may be made therein without departing from the scope of the invention.

What is claimed is:

1. An optical scanner comprising:
   an electrostrictive element having one end thereof attached to a base body;
   a convex mirror fixed to the other end of said electrostrictive element, said other end moving in a modified direction upon the application of a voltage;
   a driving circuit for applying and changing a voltage to said electrostrictive element; and
   means for emitting a light beam and directing said light beam onto the surface of said convex mirror in a direction perpendicular to the direction of the modified direction of said electrostrictive element so that, by changing the voltage applied to said electrostrictive element, said convex mirror surface reflects said beam in a direction corresponding to the voltage applied.

2. The optical scanner of claim 1, wherein said electrostrictive element is a bimorph type piezoelectric element.

3. The optical scanner of claim 2, wherein said means for emitting a light beam is a He-Ne laser.

4. The optical scanner of claim 1, wherein said electrostrictive element is a multilayer type piezoelectric element, said convex mirror being fixed on an end surface of said multilayer type piezoelectric element perpendicular to the modified direction thereof.

5. The optical scanner of claim 4, wherein a mirror surface of said convex mirror comprises an overall surface of a cylindrical body.

6. The optical scanner of claim 4, wherein said convex mirror is fixed with an epoxy type adhesive agent.

7. The optical scanner of claim 1, wherein a mirror surface of said convex mirror comprises an overall surface of a spherical body.

8. The optical scanner of claim 7, wherein said convex mirror is fixed with an epoxy type adhesive agent.

9. The optical scanner of claim 1, wherein a mirror surface of said convex mirror comprises a partial surface of a spherical body.

10. The optical scanner of claim 9, wherein said convex mirror is fixed with an epoxy type adhesive agent.

11. The optical scanner of claim 1, wherein a mirror surface of said convex mirror comprises an overall surface of a cylindrical body.

12. The optical scanner of claim 11, wherein said convex mirror is fixed with an epoxy type adhesive agent.

13. The optical scanner of claim 1, wherein a mirror surface of said convex mirror comprises an overall surface of of a columnar body.

14. The optical scanner of claim 13, wherein said convex mirror is fixed with an epoxy type adhesive agent.

15. The optical scanner of claim 1, wherein a mirror surface of said convex mirror comprises a partial surface of a cylindrical body.

16. The optical scanner of claim 15, wherein said convex mirror is fixed with an epoxy type adhesive agent.

17. The optical scanner of claim 1, wherein said means for emitting a light beam is a He-Ne laser.

18. The optical scanner of claim 1, wherein said convex mirror is fixed with an epoxy type adhesive agent.

* * * * *